United States Patent [19]

Mudder et al.

[11] 4,440,644
[45] Apr. 3, 1984

[54] METHOD FOR THE BIOLOGICAL REMOVAL OF FREE AND COMPLEX CYANIDES AND THIOCYANATES FROM WATER

[75] Inventors: Terrence I. Mudder, Piedmont; James L. Whitlock, Spearfish, both of S. Dak.

[73] Assignee: Homestake Mining Company, Lead, S. Dak.

[21] Appl. No.: 486,610

[22] Filed: Apr. 20, 1983

[51] Int. Cl.$^3$ .................. C02F 3/34; C02F 3/08; C12R 1/38; C12N 1/20
[52] U.S. Cl. .................. 210/611; 210/619; 210/904; 435/253; 435/262; 435/874
[58] Field of Search ........ 210/904, 611, 610, 615–619; 435/253, 874, 262

[56] References Cited

U.S. PATENT DOCUMENTS

| | | | |
|---|---|---|---|
| 3,145,166 | 8/1964 | Howe | 210/904 |
| 3,660,278 | 5/1972 | Mimura et al. | 210/904 |
| 3,940,332 | 2/1976 | Kato et al. | 210/611 |

FOREIGN PATENT DOCUMENTS

| | | | |
|---|---|---|---|
| 53-54859 | 5/1978 | Japan | 210/611 |
| 2025919 | 1/1980 | United Kingdom | 210/611 |

OTHER PUBLICATIONS

Holmes B. et al., "*Pseudomonas paucimobilis*", Int. Jour. of Systematic Bacteriology; Apr. 1977, vol. 27, No. 2, pp. 133–146.

Primary Examiner—Benoit Castel
Attorney, Agent, or Firm—Townsend & Townsend

[57] ABSTRACT

Cyanides, thiocyanates and metal cyanide complexes present in an aqueous solution can be biologically degraded by certain mutant strains of the species *Pseudomonas paucimobilis*. Such microorganisms are useful in the biological treatment of cyanide-containing wastewaters.

*Pseudomonas paucimobilis mudlock* was deposited at the ATCC on Nov. 3, 1982, and granted accession No. 39204.

3 Claims, No Drawings

METHOD FOR THE BIOLOGICAL REMOVAL OF FREE AND COMPLEX CYANIDES AND THIOCYANATES FROM WATER

BACKGROUND OF THE INVENTION

1. Field of the Invention

This invention relates to the biological treatment of aqueous solutions such as wastewater to remove dissolved cyanides.

2. Description of the Prior Art

Metal complexed cyanides in wastewaters form as a result of interactions of free cyanide with metals present in the wastewater and exhibit varying degrees of stability, toxicity, and treatability. Thiocyanate, a pollutant commonly found in cyanide-containing wastewaters, is formed through the interaction of free cyanide with sulfur-containing species both present in the wastewater.

In certain industrial processes, such as the beneficiation of gold and silver and electroplating, cyanide is an essential reagent. Since free cyanide, complexed cyanides, and thiocyanates are potentially toxic to humans and aquatic organisms, these compounds and complexes must be removed from wastewaters prior to their discharge into surface or ground waters serving as potential potable water sources, marine or fresh water habitats.

Conventional chemical treatment processes utilized in treating these wastewaters include ozonation, alkaline chlorination, and copper-catalyzed hydrogen peroxide. Although ozonation removes free cyanides, metal complexed cyanides, and thiocyanates through oxidation, ozonation will not oxidize the extremely stable iron complexed cyanides (ferri- and ferro-cyanide). Also, the oxidation of cyanides and thiocyanates with ozone products ammonia which is toxic to both humans and aquatic organisms in elevated concentrations. Further treatment is required to remove residual cyanides and ammonia. Ozonation also requires expensive and sophisticated equipment which is difficult to maintain and operate without highly skilled technicians.

Alkaline chlorination removes the compounds removed by ozonation, as well as removing metals through precipitation at elevated pH. Unfortunately, the process effluents contain residual iron complexed cyanides, chlorine, and ammonia, which are toxic and must be removed through further treatment. Excessive chlorine quantities are required when thiocyanate is present, and the efficiency of metals removal is highly pH dependent.

Copper-catalyzed hydrogen peroxide (see U.S. Pat. No. 3,617,567 to Mathre) removes free and complexed cyanides (including the stable iron complexed cyanides) through oxidation, but does not remove thiocyanate or by-product ammonia, both of which are toxicants which must be removed through further treatment. Also, the copper which must be added as a catalyst is toxic to aquatic organisms and must be removed prior to discharge of the wastewater. A relatively large quantity of expensive hydrogen peroxide must be utilized regardless of the cyanide concentration.

Various biological treatment methods have been proposed for removing cyanide from wastewaters. U.S. Pat. No. 3,756,947 to Fujii et al. discloses the addition of a microorganism selected from the genera Alcaligenes and/or Achromobacter to an activated sludge to degrade nitriles and cyanides. U.S. Pat. No. 3,940,332 to Kato et al. discloses the use of a microorganism selected from the genus Norcardia to remove nitriles and cyanides from wastewaters. U.S. Pat. No. 3,660,278 to Mimura suggests the acclimatization of a microorganism from the genus Pseudomona to decompose hydrogen cyanide. Multiple stage chemical and biological wastewater treatment processes are disclosed in U.S. Pat. No. 3,816,306 to Roy and U.S. Pat. No. 4,188,289 to Besik.

The bacterial strain *Pseudomonas paucimobilis* is described in Holmes, et. al. (1977) *Int. J. Sys. Bacteriol.* 27:133-146.

SUMMARY OF THE INVENTION

The biological treatment process of the present invention overcomes the problems associated with the chemical treatment processes. The process not ony oxidizes free and complexed cyanides, including the stable iron complexed cyanides, but also thiocyanates. Moreover, the process does not produce ammonia as a by-product. The only chemical requirements are phosphorus and inorganic carbon in the forms of phosphoric acid and soda ash or bicarbonate, respectively. The primary process requirement is development of or addition of a mutant bacterial strain selected from the species *Pseudomonas paucimobilis* which has been gradually and specifically acclimated to the wastewater having high concentrations of cyanides, cyanide complexes and thiocyanates. The biological treatment process can be employed as the primary treatment process or as a pre-treatment process prior to chemical treatment or as a post-treatment process following chemical treatment.

Cyanides, metal cyanide complexes and thiocyanates are oxidized into environmentally acceptable nitrates and sulfates by one or more mutant microorganism strains selected from the species *Pseudomonas paucimobilis*. The mutant strains may be developed by stressing a wild type strain in an environment having high concentrations of cyanide, metal cyanide complexes and thiocyanates. In particular, the microorganism *Pseudomonas paucimobilis mudlock*, A.T.C.C. accession no. 39204, has been developed and found suitable for wastewater treatment.

DESCRIPTION OF THE PREFERRED EMBODIMENT

The present invention involves a biological treatment process for the degradation and removal from wastewaters of free cyanides, metal-complexed cyanides, and thiocyanates to environmentally acceptable levels prior to discharge of the wastewaters into surface or ground waters. The process will find wide-spread application in the gold and silver beneficiation and electroplating industries either as the primary treatment process or as a post-treatment or pre-treatment process for other chemical and/or physical treatment processes.

According to the present invention, at least one microorganism capable of degrading cyanides and thicyanates selected from the species *Pseudomonas paucimobilis* is acclimated to a microbial growth under conditions of high concentrations of free cyanide, metal complexed cyanide, and thiocyanate. An example of such an acclimated mutant strain capable of degrading cyanides and thiocyanates is *Pseudomonas paucimobilis mudlock*, ATCC accession no. 39204. This mutant strain has been isolated in pure culture by the inventors herein. Diagnostic characteristics of this strain are given in Table I.

TABLE I

Taxonomical Characteristics Of
*Pseudomonas paucimobilis* mudlock
ATCC No. 39204

| | |
|---|---|
| Colony formation | Translucent, smooth |
| Staining reactions: | |
| Gram | (−, rods) |
| Capsule | (+) |
| Acid fast | (−) |
| Metachromatic granules | (−) |
| Growth at: | |
| 42° C. | (−) |
| Motility | (−) |
| Acid from: | |
| Glucose | (+) |
| Lactose | (+) |
| Sucrose | (−) |
| Mannitol | (−) |
| Mannose | (−) |
| Salicin | (−) |
| Inositol | (−) |
| Xylose | (+) |
| Maltose | (+) |
| Esculin | (+) |
| Galactose | (−) |
| Oxidase | (+) |
| Catalase | (−) |
| Growth on MacConkey | (−) |
| Indole | (−) |
| Methyl Red | (−) |
| Acetylmethylcarbinol | (−) |
| Phenylalanine deaminase | (−) |
| Lysine decarboxylase | (−) |
| Ornithine decarboxylase | (−) |
| Dextrin | (−) |
| Starch | (+) |
| Casein | (+) |
| DNAse | (+) |
| Citrate | (−) |
| Urease | (−) |
| Nitrate reduction | (−) |
| Cellulase | (−) |
| Hemolysis BAP | (−) |
| Coagulase | (−) |
| Hydrogen sulfide | (−) |
| Fluorescein | (−) |
| Pyocyanin | (−) |
| Gelatin | (−) |

The designated strain is an example of a microorganism which may be used in the process of the present invention. Other mutant strains of *Pseudomonas paucimobilis* can be used so long as the strain is capable of degrading cyanides and thiocyanates and propagating in a biological media. Two or more mutant strains can be used simultaneously.

The mutant bacterial strains of the present invention may be obtained by acclimating wild type *Pseudomonas paucimobilis* under conditions of relatively high total cyanide and thiocyanate conditions. Typically, the concentration of total cyanide in the growth media will exceed 1 mg/L, more typically exceeding 2 mg/L, with an upper limit of about 20 mg/L. The total cyanide concentration will normally be in the range from 5 to 15 mg/L. The thiocyanate concentration will be somewhat greater, being from about 5 mg/L to 100 mg/L, usually being from about 20 mg/L to 70 mg/L. The growth medium will also contain inorganic salts, such as calcium phosphate, as necessary for growth.

Conveniently, the mutant strain of the present invention may be acclimated by inoculating the wastewater to be treated with a wild type *Pseudomonas paucimobilis*. Depending on the type of treatment involved, the amount of inoculant will vary. Specific conditions for rotating biological discs and biological filters are given hereinafter.

The overall bacteria process completely mineralizes thiocyanate and the cyanide compounds, as well as their breakdown products, to the relatively harmless and environmentally compatible inorganic compounds bicarbonate, sulfate, and nitrate. Growth of the bacteria requires addition of phosphorus as a trace nutrient and addition of an inorganic carbon source (i.e. soda ash or bicarbonate) for the bacteria involved in nitrification process.

The microorganisms of the present invention are compatible with virtually any conventional biological digestion technique, such as suspended growth processes including activated sludge, and attached growth processes including rotating biological contactors, biofilters and the like. In each case, the biological treatment is effected by one or more microorganisms which together grow as an aerobic flora which is exposed to the wastewater. The dissolved organic matter in the wastewater provides the nutrient for growth of the flora. In the present invention, the aerobic flora includes the particular microorganisms which metabolize cyanides and thiocyanates to environmentally acceptable nitrates and sulfates.

Perhaps the most common method of biological treatment is the use of activated sludge, which is the biologically active sediment produced by the repeated aeration and settling of sewage and/or organic wastes. The activated sludge comprises a mixture of bacteria, protozoa, and miscellaneous higher forms of life. The types and numbers of the various organisms will vary with the types of food present and with the length of the aeration. The activated sludge which forms metabolizes the polluting organic matter in the sewage and waste, leaving environmentally acceptable metabolites in the effluent.

The activated sludge process, with minor variations, typically consists of aeration through submerged porous diffusers or by mechanical surface agitation, of either raw or settled sewage for a period from about two to six hours, followed by settling of the solids for a period of from about one to two hours. These solids, which comprise the solids in the sewage together with the biological growth which develops, are maintained in the aeration tanks to provide seed for continued biological treatment. Sludge is allowed to accumulate until there is from about 1000 to 3000 ppm of suspended sludge in the aeration liquor. Excess sludge is withdrawn from the aeration tanks and disposed.

While suspended growth processes, such as the activated sludge process just described are functional, they often suffer from accumulation of toxic metals, particularly in treating mining and electroplating wastes with high concentrations of such metals. In such cases, it is preferred to use an attached growth process. Attached growth processes in general provide more efficient removal of contaminants than suspended growth process. In carrying out such attached growth processes, two types of equipment are generally employed. One type of equipment involves a vertical enclosure containing a fixed media of rock or plastic. This type of biological treatment equipment is referred to as a trickling filter, biological filter, or biotower depending upon the surface area of the unit and its depth. The wastewater flows by gravity down through each unit and the bacteria attach and grow upon the stationary media. A portion of the effluent (25% to 100%) is continuously recycled through each unit. The design of the units is based upon a hydraulic loading rate (gallons/day/ft$^2$) and/or a mass loading rate (pounds/day/ft$^2$) with a hydraulic retention time within the unit ranging from a fraction of an hour to several hours depending upon the raw and recycle flows.

The second type of equipment that can be employed is referred to as a rotating biological contactor, rotating biological surface, or rotating biological disc. The equipment consists of a steel shaft onto which is affixed circular synthetic media (polyethylene or polypropylene) of varying diameters creating a total surface area on each unit typically in the range from 100,000 ft$^2$ to 150,000 ft$^2$. The shaft and media are rotated in the wastewater by an air or mechanical drive at approximately 1 rpm with approximately 40% of the media surface exposed to the wastewater at any instant. Oxygen for the aerobic bacterial process is supplied either by natural aeration or mechanical aeration of the wastewater through air headers and coarse bubble diffusers. The design of each unit is identical to that of the biological filters with a hydraulic retention time of approximately 3 to 6 hours for complete treatment.

The design and manufacture of the rotating biological discs is well kown and not a part of the present invention. Both the rotating biological discs and biological filters are arranged in multiple stages to assure adequate treatment. The number and arrangement of the units depends upon the degree of treatment desired, the concentration of pollutants in the wastewater, the design wastewater flows, and the temperature of the wastewater.

To initiate bacterial growth, the following procedure is utilized. First a wastewater flow of about 0.25–0.50 gpd/ft$^2$ or about 0.25–0.50 gpm/ft$^2$ is established through the rotating biological disc or biological filter, respectively. The recycle flow through the biological filter should be 25–50% of the raw wastewater flow. Secondly, nutrient addition to the wastewater is started to supply necessary phosphorus and/or inorganic carbon. For each 100 mg/L of SCN$^-$ or CN$^-$ to be degraded the wastewater should contain 5 mg/L phosphorus and 200 mg/L alkalinity expressed as CaCO$_3$. The phosphorus can be supplied as H$_3$PO$_4$ and the alkalinity as NaHCO$_3$ or NA$_2$CO$_3$. The wastewater can contain between 100–150 mg/L SCN$^-$, 5–25 mg/L total CN$^-$, and 5–20 mg/L total metals initially.

The microorganisms of the present invention can be cultured by any well-known technique. For example, a liquid culture medium containing a carbon source, a nitrogen source which may be but need not be cyanide or thiocyanate, and various inorganic salts such as calcium phosphate and other nutrients is suitable. The culture medium is then adjusted to a temperature suitable for growth and innoculated with cells of the microorganism separately grown and prepared on an agar medium. So long as the culture is carried out under sterile conditions, the resulting culture of cells will be pure.

Pure cell cultures of said microorganisms may then be innoculated into the biological growth medium of the particular treatment process. For example, with activated sludge, the pure culture can be directly added and acclimated to the activated sludge. It is desirable to add a volume of cells equal to approximately one-tenth the volume of sludge in the aeration tank, preferably at least one-fifth.

EXPERIMENTAL RESULTS

The wastewater tested was a two component wastewater consisting of water pumped from underground mining operations and referred to an "mine water," and water pumped from a tailings empoundment and referred to as "decant water." The primary pollutants contained in the combined wastewaters include free cyanide (HCN$^-$/CN$^-$), ferro-cyanide, ferri-cyanide, copper cyanide, zinc cyanide, nickel cyanide, and thiocyanate. The analytical procedures used in the analysis of the wastewater are contained in *Standard Methods for the Examination of Water and Wastewater*, Franson (Ed.), Byrd Free Press, Springfield, Va. (1981). The total cyanide procedure measures free cyanide and cyanide bound to all metals including iron. The method-c cyanide procedure measures free cyanide and cyanide bound to all metals except the cyanide bound to iron.

The concentration of the pollutants in the wastewater varies due to the time of the year, the temperature of the wastewater, the dilution of decant water due to precipitation, and the ratio of the mine to decant water being treated as the mine water is relatively free of pollutants. The temperature of the combined wastewaters varies from approximately 11° C. in the winter to 25° C. in the summer.

Three pilot plants were utilized in the examination of the degradation and removal of cyanides and thiocyanates from the wastewater. An 0.5 meter RBC (rotating biological contactor) and a 2 meter RBC were obtained from Autotrol Corporation, Milwaukee, Wisc., and a 20 foot (2 foot diameter) biotower packed with a synthetic media obtained from B. F. Goodrich, Akron, Ohio, was constructed on site.

EXPERIMENT 1

The 0.5 meter RBC was operated continuously from April through January of the following year. The plastic discs were 0.5 meters in diameter with a total unit surface area of 250 ft$^2$. The initial hydraulic loading rate was 0.5 gpd/ft$^2$ of a wastewater consisting of a 60/40 mixture of mine/decant water. Continuous bacterial seeding was employed with a seed consisting of a mixture of decant water, activated sludge from the local wastewater treatment facility, and water from the seepage collection pump located below the tailings empoundment. When it was determined the necessary bacteria were indigenous to the wastewater the continuous seeding process was discontinued. Phosphorus was added continuously to the influent wastewater in the form H$_3$PO$_4$ to achieve a 5 mg/L phosphorus concentration in the wastewater. Approximately three weeks were required for acclimation and growth of bacteria on the disk. Generally, the wastewater flow was increased to 1.0 gpd/ft$^2$ with period flow fluctuations up to 3-8 gpd/ft$^2$. The mine/decant water ratio varied from 50/50 to 70/30 with the ratio normally between 70/30 and 60/40. The lowest wastewater temperature encountered was 11° C. with no significant decrease in bacterial performance. Since nitrification was not examined on the 0.5 meter RBC continuous addition of inorganic carbon was not undertaken. A summary of several months performance of the 0.5 meter RBC is presented in Table 1.

After the trial run was completed, the bacterial species responsible for the cyanide and thiocyanate degradation was isolated and toxonomically identified, as set forth in Table 1. The strain was designated *Pseudomonas paucimobilis mudlock*.

effect of nitrification with excellent results. The effluent ammonia concentrations rarely exceed 2 mg/L mea-

TABLE 1

SUMMARY OF PERFORMANCE FOR THE 0.5M RBC PILOT PLANT FROM JULY THROUGH JANUARY

| PARAMETER | INFLUENT* CONCENTRATION(mg/L) | EFFLUENT CONCENTRATION(mg/L) | DEGRADATION AND REMOVAL(%) | MONTHLY AVERAGE FOR** |
|---|---|---|---|---|
| SCN$^-$ | 104.0 ± 34.0 | 2.0 ± 3.0 | 98.0 | JULY |
| " | 91.0 ± 8.0 | 2.0 ± 2.0 | 98.0 | AUGUST |
| " | 51.0 ± 7.0 | less than 1.0 | 98.0 | NOVEMBER |
| " | 58.0 ± 9.0 | less than 1.0 | 98.0 | JANUARY |
| TOTAL CN$^-$ | 3.88 ± 1.46 | 0.25 ± .11 | 94.0 | JULY |
| " | 2.50 ± 3.73 | 0.21 ± .18 | 92.0 | AUGUST |
| " | 2.02 ± 0.58 | 0.13 ± .03 | 93.6 | NOVEMBER |
| " | 4.90 ± 1.40 | 0.22 ± .26 | 95.5 | JANUARY |
| METHOD-C CN$^-$ | 2.23 ± 1.00 | 0.08 ± .05 | 96.4 | JULY |
| " | 1.33 ± 0.40 | 0.06 ± .06 | 95.0 | AUGUST |
| " | 0.77 ± 0.22 | 0.04 ± .04 | 95.0 | NOVEMBER |
| " | 2.80 ± 1.20 | 0.05 ± .02 | 98.0 | JANUARY |

*All concentrations reported ± one standard deviation
**Monthly averages are calculated from daily grab sample analyses

EXPERIMENT 2 sured as nitrogen. Several months performance data for the 2 meter RBC are presented in Table 2.

TABLE 2

SUMMARY OF PERFORMANCE FOR THE 2M RBC PILOT PLANT FROM NOVEMBER THROUGH MAY

| PARAMETER | INFLUENT* CONCENTRATION(mg/L) | EFFLUENT CONCENTRATION(mg/L) | DEGRADATION AND REMOVAL(%) | MONTHLY AVERAGE FOR** |
|---|---|---|---|---|
| SCN$^-$ | 51.0 ± 7.0 | less than 1.0 | 98.0 | NOVEMBER |
| " | 58.0 ± 9.0 | less than 1.0 | 98.0 | JANUARY |
| " | 60.0 ± 10.0 | less than 1.0 | 98.0 | APRIL |
| " | 56.0 ± 12.0 | less than 1.0 | 98.0 | MAY |
| TOTAL CN$^-$ | 2.02 ± 0.58 | 0.22 ± .07 | 89.0 | NOVEMBER |
| " | 4.90 ± 1.40 | 0.60 ± .50 | 88.0 | JANUARY |
| " | 7.73 ± 1.62 | 1.25 ± .90 | 84.0 | APRIL |
| " | 6.50 ± 2.10 | 0.35 ± .10 | 94.5 | MAY |
| METHOD-C CN$^-$ | 0.77 ± 0.22 | 0.04 ± .02 | 95.0 | NOVEMBER |
| " | 2.80 ± 1.20 | 0.07 ± .04 | 97.5 | JANUARY |
| " | 4.80 ± 1.00 | 0.06 ± .03 | 99.0 | APRIL |
| " | 4.10 ± 1.30 | 0.05 ± .01 | 99.0 | MAY |

*All concentrations reported ± one standard deviation
**Monthly averages are calculated from daily grab sample analyses The 2 meter RBC was operated continuously from September to May of the following year. The RBC pilot plant consists of 2 meter diameter plastic discs with a total unit surface are of 8,000 ft$^2$. The media is arranged into four separate compartments each containing 2,000 ft$^2$ of surface area. The initial hydraulic loading rate was 0.5 gpd/ft$^2$. Continuous bacterial seeding was accomplished by discharging the effluent from the 0.5 meter RBC into the first chamber of the 2 meter RBC at a rate of 500 mL/min. Phosphorus was added at a rate to produce a 5 mg/L phosphorus concentration in the influent. Growth was rapid and visible within seven days. The hydraulic loading rate was then increased to 1.5 gpd/ft$^2$ with influent thiocyanate, total cyanide, and total metals concentration periodically reaching 120 mg/L, 15 mg/L, and 10 mg/L, respectively, with no significant decrease in RBC performance. The mine/decant ratio varies from 40/60 to 70/30 depending upon the dilution of decant water due to precipitation and its temperature, which was 11° C. in January with no significant decrease in RBC performance. In January addition of 110 mg/L Na$_2$CO$_3$ was initiated to examine the

EXPERIMENT 3

In addition to the two RBC pilot plants evaluated, another attached growth bacterial treatment process was examined referred to as a biological tower, biological filter, or trickling filter. The biotower consisted of a vertical steel cylinder 2 feet in diameter and 20 feet in height and was packed with a synthetic media called KORO-Z supplied by B. F. Goodrich Company. The initial hydraulic loading rate on the biotower was 0.5 gpm/ft$^2$ (0.25 gpm/ft$^2$ raw wastewater flow and 0.25 gpm/ft$^2$ effluent recycle flow). The biotower was continuously seeded with the effluent from the 0.5 meter RBC pilot plant. The initial phosphorus concentration was again 5 mg/L was phosphorus. Initial growth was rapid with a visible growth within two weeks. Hydraulic loading rates were gradually increased to 1.0 gpm/ft$^2$ (50/50 raw/recycle wastewater flows). Although the degree of nitrification was monitored, continuous addition of soda ash was not undertaken. Several months performances data are presented in Table 3.

TABLE 3

SUMMARY OF PERFORMANCE FOR THE BIOTOWER FROM NOVEMBER THROUGH MAY

| PARAMETER | INFLUENT* CONCENTRATION(mg/L) | EFFLUENT CONCENTRATION(mg/L) | DEGRADATION AND REMOVAL(%) | MONTHLY AVERAGES FOR** |
|---|---|---|---|---|
| SCN$^-$ | 51.0 ± 7.0 | less than 1.0 | 98.0 | NOVEMBER |
| " | 58.0 ± 9.0 | less than 1.0 | 98.0 | JANUARY |
| " | 56.0 ± 12.0 | less than 1.0 | 98.0 | APRIL-MAY |
| TOTAL CN$^-$ | 2.02 ± 0.58 | 0.22 ± .06 | 89.0 | NOVEMBER |
| " | 4.90 ± 1.40 | 0.87 ± .30 | 82.0 | JANUARY |
| " | 6.50 ± 2.10 | 1.07 ± .51 | 83.5 | APRIL-MAY |
| METHOD-C CN$^-$ | 0.77 ± 0.22 | 0.07 ± .02 | 91.0 | NOVEMBER |
| " | 2.80 ± 1.20 | 0.15 ± .06 | 94.5 | JANUARY |
| " | 4.10 ± 1.30 | 0.08 ± .04 | 98.0 | APRIL-MAY |

*All concentrations are reported ± one standard deviation
**Monthly averages are calculated from daily grab sample analyses Although the foregoing invention has been described in some detail by way of illustration and example for purposes of clarity of understanding, it will be obvious that certain changes and modifications may be practiced within the scope of the appended claims.

What is claimed is:

1. A process for the biological degradation of cyanides, thiocyanates and metal cyanide complexes in an aqueous waste wherein organic matter dissolved in said waste acts as nutrients for growth of an aerobic flora, said process comprising:

acclimating in said aerobic flora at least one microorganism of the strain *Pseudomonas paucimobilis mudlock*, ATCC accession no. 39204; and contacting the aqueous waste with the aerobic flora to degrade the cyanides, thiocyanates and metal cyanide complexes to environmentally acceptable products.

2. A process as in claim 1, wherein the aqueous waste is contacted with the aerobic flora in a rotating biological contactor where the flora is attached to rotating discs which carry the flora into the aqueous waste during a portion of their rotation and expose the flora to air during the remaining portion of rotation.

3. A process as in claim 1, wherein the aqueous waste is contacted with the aerobic flora in an activated sludge system where the flora and waste are alternatively agitated and allowed to settle with continuous aeration.

* * * * *